(12) United States Patent
Maor et al.

(10) Patent No.: US 10,885,059 B2
(45) Date of Patent: Jan. 5, 2021

(54) TIME SERIES TRENDS

(71) Applicant: ENTIT SOFTWARE LLC, Sanford, NC (US)

(72) Inventors: Alina Maor, Haifa (IL); Renato Keshet, Haifa (IL); Reuth Vexler, Haifa (IL)

(73) Assignee: MICRO FOCUS LLC, Santa Clara, CA (US)

( * ) Notice: Subject to any disclaimer, the term of this patent is extended or adjusted under 35 U.S.C. 154(b) by 239 days.

(21) Appl. No.: 16/068,001

(22) PCT Filed: Jan. 8, 2016

(86) PCT No.: PCT/US2016/012662
§ 371 (c)(1),
(2) Date: Jul. 3, 2018

(87) PCT Pub. No.: WO2017/119900
PCT Pub. Date: Jul. 13, 2017

(65) Prior Publication Data
US 2019/0026351 A1  Jan. 24, 2019

(51) Int. Cl.
*G06F 16/00* (2019.01)
*G06F 16/26* (2019.01)
(Continued)

(52) U.S. Cl.
CPC ......... *G06F 16/26* (2019.01); *G06F 16/248* (2019.01); *G06F 16/2477* (2019.01);
(Continued)

(58) Field of Classification Search
None
See application file for complete search history.

(56) References Cited

U.S. PATENT DOCUMENTS 7,685,117 B2   3/2010 Gross
7,818,224 B2 * 10/2010 Boerner ................. G06F 17/18
705/35
(Continued)

FOREIGN PATENT DOCUMENTS

JP   2000194745 A   7/2000
JP   2008129952 A   6/2008
WO  WO2017034512 A1  3/2017

OTHER PUBLICATIONS

"Mann-Kendall Test for Monotonic Trend," available at http://vsp.pnnl.gov/help/Vsample/Design_Trend_Mann_Kendall.htm.
(Continued)

*Primary Examiner* — Debbie M Le

(57) ABSTRACT

Examples disclosed herein relate, among other things, to a method. The method may obtain a time series comprising a plurality of data points associated with a sub-segment of a segment, obtaining a plurality of weights associated with a plurality of data point pairs from the plurality of data points, and based on the plurality of weights and the plurality of data point pairs, determine whether the time series comprises a trend. Based on a determination that the time series comprises a trend, the method may calculate a trend score for the trend based on at least one characteristic of at least one of the segment and the sub-segment, and provide the trend for display.

16 Claims, 4 Drawing Sheets

(51) Int. Cl.
*G06Q 10/04* (2012.01)
*G06Q 10/06* (2012.01)
*G06F 16/2458* (2019.01)
*G06F 16/2457* (2019.01)
*G06F 16/248* (2019.01)

(52) U.S. Cl.
CPC ....... *G06F 16/24578* (2019.01); *G06Q 10/04* (2013.01); *G06Q 10/06* (2013.01)

(56) References Cited

U.S. PATENT DOCUMENTS

| | | | |
|---|---|---|---|
| 8,171,033 B2* | 5/2012 | Marvasti | G06F 17/18 707/748 |
| 9,213,978 B2 | 12/2015 | Melamed et al. | |
| 10,127,695 B2* | 11/2018 | Garvey | G06Q 10/06 |
| 2005/0137830 A1 | 6/2005 | Moessner et al. | |
| 2007/0100875 A1 | 5/2007 | Chi et al. | |
| 2007/0143300 A1 | 6/2007 | Gulli et al. | |
| 2014/0283048 A1 | 9/2014 | Howes et al. | |
| 2015/0332192 A1 | 11/2015 | Harel | |
| 2017/0249649 A1* | 8/2017 | Garvey | G06Q 10/06 |

OTHER PUBLICATIONS

H. B. Mann, "Non-parametric tests against trend," Econometrica, vol. 13, np. 3, pp. 245-259, Jul. 1945.

Hamed, K. H., et al.; "A Modified Mann-Kandell Trend Test for Autocorrelated Data," Journal of Hydrology, vol. 204, Issues 1-4, pp. 182-196, Jan. 1998.

Hirsch, R.M. et al., "Techniques of Trend Analysis for Monthly Water Quality Data," Water Resources Research 18.1, Feb. 1982, pp. 107-121, available at https://profile.usgs.gov/myscience/upload_folder/ci2012Oct1508260828033Techniques%20of%20Trend%20Analysis%20for%20Monthly%20Water%20Quality%20Data.pdf.

International Searching Authority., International Search Report and Written Opinion dated Sep. 23, 2016 for PCT Application No. PCT/US2016/012662 Filed Jan. 8, 2016, 13 pages.

Kendall, M.G., "Rank Correlation Methods," Rank Correlation Methods, 1948, 3rd Edition.

Lane, D; "Introduction to Linear Regression"; 4 pages; printed on Jan. 5, 2016 from: http://onlinestatbook.com/2/regression/intro.html.

Li C. Xia et al.; "Statistical Significance Approximation in Local Trend Analysis of High-throughput Time-series Data Using the Theory of Markov Chains"; Sep. 21, 2015; 16 pages.

Sillitto, G.P., "The Distribution of Kendall's τ Coefficient of Rank Correlation in Rankings Containing Tie," Biometrika, vol. 34, No. 1/2, Jan. 1947, pp. 36-40, available at http://www.bios.unc.edu/~mhudgens/bios/662/2006fall/sillito.pdf.

Wikipedia, "Goodness of Fit," Oct. 11, 2015, 4 pages, available at https://en.wikipedia.org/wiki/Goodness_of_fit.

Wikipedia, "Kendall Rank Correlation Coefficient," Dec. 20, 2015, 6 pages, available at https://en.wikipedia.org/wiki/Kendall_rank_correlation_coefficient.

Wikipedia; "Correlation and dependence"; printed on Jan. 5, 2016 from: https://en.wikipedia.org/wiki/Correlation_and_dependence; 9 pages.

* cited by examiner

TIME SERIES TRENDS

BACKGROUND

Computing devices today possess great storage and computational capacities, allowing researchers and analysts to obtain, store, and process vast amounts of data. However, as the amounts of processed data are increased, determining which data has particular significance to a particular user and presenting such data to the user in a meaningful manner becomes an increasingly challenging task.

BRIEF DESCRIPTION OF THE DRAWINGS

The following detailed description references the drawings, wherein.

DETAILED DESCRIPTION

As mentioned above, identifying relevant information from large amounts of unprocessed data can be a very difficult computational task. Combining, filtering, or sorting the data may facilitate the analysis for the user, but such manipulations may not help the user to detect correlations between various data parameters, determine whether and how these correlations change over time, or identify significant changes and trends within the data. Thus, some users may wish to have a system and method for analyzing comparable entities with monitored temporal activity, discovering trends in the entities' temporal activities, and prioritizing the trends based on their stability, significance to the user, and other factors discussed in more detail below.

For example, in the healthcare industry (e.g., in clinical trials, personalized tracking systems, etc.) the patients and doctors may not be alerted that there is an alarming trend in a particular parameter (e.g., blood count) that is steadily increasing or decreasing over time, or whose portion relative to another parameter is steadily increasing or decreasing, until the increase or decrease exceeds a certain threshold. Earlier detection of such trends may result in prevention or more effective treatment of various medical problems. As another example, in the financial industry, financial analysts may wish to compare between different markets and find emerging or broken trends in market player activities, which may hint about potential competitors, local problems at certain markets, and so forth. As yet another example, in the network security sector, an increasing activity from a certain source and/or of a certain type may not be detected unless and until the level of activity crosses a certain threshold, even if there is a clear pattern of existence of that activity. Network security professionals may wish to be alerted as soon as such activity trends are detected, so they could analyze and respond to threats as soon as possible.

Examples disclosed herein describe, among other things, a computing device. The computing device may include, among other things, a trend detection engine, a trend evaluation engine, and a graphical user interface (GUI) engine. The trend detection engine may obtain a time series comprising a plurality of data points associated with a sub-segment of a segment, obtain a plurality of weights associated with a plurality of data point pairs from the plurality of data points; determine a stability significance of the time series based on the plurality of weights and the plurality of data point pairs, and based on the stability significance, determine whether the time series comprises a trend. The trend evaluation engine may then calculate a trend score for the trend based on the stability significance and at least one characteristic of at least one of the segment and the sub-segment. The graphical user interface (GUI) engine may then provide the time series for display.

Figure 1:
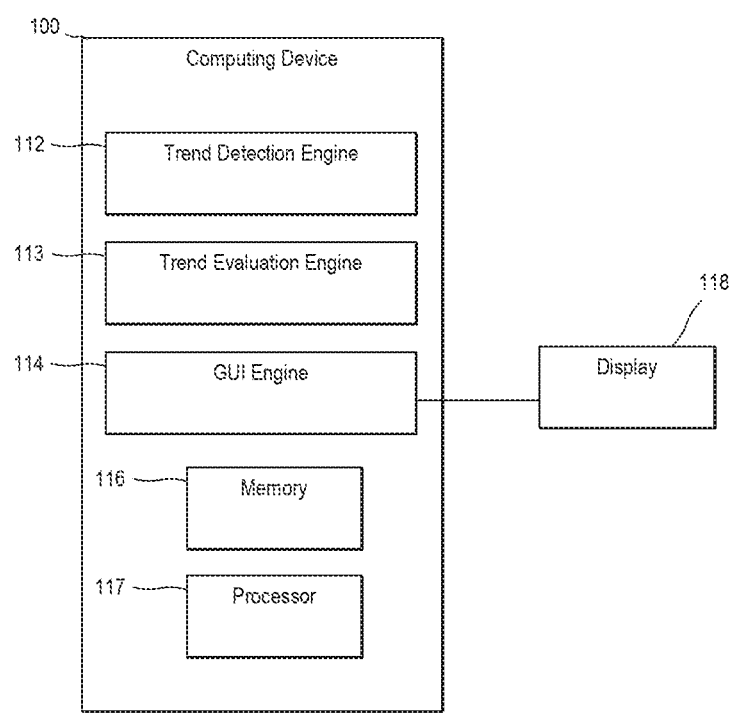
FIG. 1 is a block diagram of an example computing device.

FIG. 1 is a block diagram of an example computing device 100. Computing device 100 may include a smartphone, cell phone, tablet, laptop, desktop, server, application-specific computing device, any other processing device or equipment. In some examples, computing device 100 may also include any combination of one or more computing devices of the same type or of different types. For example, computing device 100 may include at least a server device communicatively coupled to a client device. As illustrated in FIG. 1, computing device 100 may include a trend detection engine 112, a trend evaluation engine 113, a graphical user interface (GUI) engine 114, a memory 116, and a processor 117.

Trend detection engine 112, trend evaluation engine 113, and GUI engine 114 may each generally represent any combination of hardware and programming that may be embedded in computing device 100 or communicatively coupled thereto, and may correspond to separate modules or be a part of the same module. Memory 116 may also be embedded in computing device 100 or communicatively coupled thereto, and may include any type of volatile or non-volatile memory, such as a random-access memory (RAM), flash memory, hard drive, memristor-based memory, and so forth. Processor 117 may include, for example, one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. As illustrated in FIG. 1, computing device 100 may also be communicatively coupled (e.g., through GUI engine 114) to display 118, which may or may not be embedded in computing device 100. Display 118 may be implemented using any suitable technology, such as LCD, LED, OLED, TFT, Plasma, etc. In some implementations, display 118 may be a touch-sensitive display.

In some examples, trend detection engine 112 may obtain a plurality of data points, e.g., from a memory of computing device 100 (e.g., memory 116) or from a memory of another device that is communicatively coupled to computing device 100, e.g., via one or more networks, such as the Internet. The plurality of data points may be stored in a single database or file or in multiple databases or files, and may be organized in a single data table, in multiple data tables, or in any other type of data structure(s). Each data points may describe, for example, an event, a state, a status, etc., or a summary of events, states, status, etc. Each data points may be associated with temporal information that may describe, for example, a point in time or a period of time (e.g., a month, a quarter, a year, etc.) corresponding to the particular event, state, or status described by the particular data entry. Thus, the plurality of data points obtained and analyzed by trend detection engine 112 may include any type of a time series, i.e., any sequence of data points measured at different times. Moreover, in some examples, trend detection engine 112 may obtain a plurality of time series (i.e., a plurality of data point sequences), analyze each time series independently, determine whether the time series includes a stable trend, and prioritize the determined trends based at various factors, as will be discussed below.

In some examples, trend detection engine 112 may analyze the obtained plurality of data points (hereinafter referred interchangeably as a "time series") to determine whether the time series includes a trend. In some examples, this determination includes testing a null hypothesis $H_0$ of data randomness. Specifically, trend detection engine 112 may test a null hypothesis $H_0$ that the time series are a sample of independent and identically distributed random values, meaning that the time series does not include any trend. Accordingly, alternative hypothesis $H_1$ may be that the distribution of the time series is not identical for all samples, i.e., that the time series includes a trend. Disproving null hypothesis $H_0$ (i.e., proving alternative hypothesis $H_1$) would mean that the time series includes a trend.

To test the null hypothesis $H_0$, trend detection engine 112 may calculate the sum of signs of differences between all (or substantially all) possible pairs of data points in the time series. In some examples, given a time series $\{X_t\}$, trend detection engine 112 may calculate the following sum:

$$S = \sum_{k=1}^{n-1} \sum_{j=k+1}^{n} \mathrm{sgn}(X_j - X_k) \quad \text{(Eqn. 1)}$$

where n is the length of (i.e., the number of data points in) the time series, and $$\mathrm{sgn}(a) = \begin{cases} 1, & a > 0 \\ 0, & a = 0 \\ -1, & a < 0 \end{cases} \quad \text{(Eqn. 2)}$$

It can be shown that for long enough time series (e.g., n>10), under $H_0$ (under the hypothesis that $\{X_t\}$ are independent and identically distributed random numbers), the sum S in Eqn. 1 is a normally distributed variable having a zero mean (E[S]=0). Therefore, in some examples, to test the null hypothesis, trend detection engine 112 may compute a standard normal variable Z. Standard normal variable Z may be calculated, for example, using the following formula:

$$Z = \begin{cases} \dfrac{S-1}{\sqrt{\mathrm{Var}[S]}} & \text{if } S > 0 \\ 0 & \text{if } S = 0 \\ \dfrac{S+1}{\sqrt{\mathrm{Var}[S]}} & \text{if } S < 0 \end{cases} \quad \text{(Eqn. 3)}$$

After calculating the standard normal variable Z, trend detection engine 112 may determine that null hypothesis $H_0$ is accepted (i.e., the time series does not include a trend) if the following condition is true:

$$|Z| \leq z_{\alpha/2} \quad \text{(Eqn. 4)}$$

i.e., if the absolute value of the standard normal variable is less than or equal to the standard normal quantile, where $F_N(z_{\alpha/2}) = \alpha/2$, where $F_N$ is the standard normal cumulative distribution function, and a is the level of significance (e.g., 0.01, 0.05, 0.1, etc.) used by trend detection engine 112. Accordingly, trend detection engine 112 may reject null hypothesis $H_0$ and determine that the time series includes a trend if the above condition is not true.

In some examples, instead of testing the null hypothesis based on the distribution of sum S (calculated in Eqn. 1), trend detection engine 112 may test the null hypothesis by analyzing the distribution of a weighted sum $S_w$, which may be calculated as follows:

$$S_w = \sum_{k=1}^{n-1} \sum_{j=k+1}^{n} W_{k,j} \mathrm{sgn}(X_j - X_k) \quad \text{(Eqn. 5)}$$

That is, trend detection engine 112 may allocate a specific weight $W_{k,j}$ to each pair of data points $X_j$ and $X_k$, thereby increasing the effect of some pairs and decreasing the effect of other pairs on the determination of whether the time series includes a trend.

In some examples, trend detection engine 112 may assign weights based on the times associated with each data point pair $X_j$, $X_k$ or based on at least the time associated with one of the data points in the data point pair. As used herein "time" associated with a data point may refer, for example, to the date and time associated with the data point, or to the location of the data point within the time series.

For example, trend detection engine 112 may assign lower weights (or weights of "0") to older data points and higher weights (or weights of "1") to more recent data points, i.e., data points associated with later times. For example, $W_{k,j}$ may be a function that is directly related to j and/or directly related to k, that is, $W_{k,j}$ may increase (e.g., proportionally, exponentially, etc.) when j and/or k increases, where higher j and k values correspond to newer (more recent) data points. Thus, in some examples, more recent data points may have greater weights than older data points in the determination of whether or not the time series includes a trend.

As another example, trend detection engine 112 may weigh pairs of data points belonging to the same or similar "season" (i.e., same month of the year, same quarter of the year, etc.) higher than pairs of data points belonging to different seasons. That is, $W_{k,j}$ may also be a function of a season associated with data point $X_j$ and a season associated with data point $X_k$. This may help reduce the effect of data fluctuations related to seasonality on the determination of whether or not the time series includes a trend.

As yet another example, trend detection engine 112 may increase the weights of pairs in which at least one (or both) of the data points belong to the same season as the most recent season, relative to the weights of other pairs. In some examples, $W_{k,j}$ may also be a function of the distance between j and k, such as a function inversely related to the distance between j and k, causing pairs that are more distant from each other in time to weigh less than pairs that are closer to each other in time.

In some examples, it may be assumed that the time series $\{X_t\}$ includes independent and normally distributed data points. From this assumption, it follows that the difference between two data points $(X_j - X_k)$ is also normally distributed with a mean value of 0. Weighted sum $S_w$ is therefore also normally distributed, with a mean value of 0, as shown below:

$$E(S_w) = E\left[\sum_{k=1}^{n-1} \sum_{j=k+1}^{n} W_{k,j} \mathrm{sgn}(X_j - X_k)\right] = \quad \text{(Eqn. 6)}$$

-continued $$\sum_{k=1}^{n-1}\sum_{j=k+1}^{n} W_{k,j} E[\text{sgn}(X_j - X_k)] = 0$$

Accordingly, the variance of $S_w$ may be calculated as follows:

$$\text{Var}[S_w] = \qquad\qquad\qquad\qquad\qquad\text{(Eqn. 7)}$$

$$E(S_w - E(S_w))^2 = E(S_w)^2 = E\left[\sum_{k=1}^{n-1}\sum_{j=k+1}^{n} W_{k,j}\text{sgn}(X_j - X_k)\right]^2 =$$

$$\sum_{k=1}^{n-1}\sum_{j=k+1}^{n} W_{k,j}^2 E[(\text{sgn}(X_j - X_k))^2] +$$

$$\sum_{k=1}^{n-1}\sum_{j=k+1}^{n}\sum_{i=k+1}^{n} W_{k,j} W_{k,i} E[\text{sgn}(X_j - X_k)\text{sgn}(X_i - X_k)] +$$

$$\sum_{k=1}^{n-1}\sum_{j=k+1}^{n}\sum_{\substack{k=1\\k\neq i,l\neq j}}^{n-1}\sum_{l=k+1}^{n} W_{i,j} W_{k,l}$$

$$E[\text{sgn}(X_j - X_i)\text{sgn}(X_l - X_k)]$$

From the assumption that time series $\{X_t\}$ includes independent and normally distributed data points, it follows that $E[\text{sgn}(X_j-X_i)\text{sgn}(X_i-X_k)]=0$ when $i\neq j\neq k\neq l$. Thus, the last term in Eqn. 7 may be eliminated. Furthermore, in some examples it may be assumed that time series $\{X_t\}$ does not have any ties (data points equal in value). In these examples, $\text{sgn}(X_j-X_k)^2$ is always equal to 1, meaning that $E[(\text{sgn}(X_j-X_k))^2]=1$. In addition, it may be shown that for a series that has no ties, $E[\text{sgn}(X_j-X_k)\text{sgn}(X_i-X_k)]=1/9$. Accordingly, in the examples where the time series is assumed to have no ties, the following formula can be used by trend detection engine 112 to calculate the variance of the weighted sum of the time series:

$$\text{Var}[S_w] = \sum_{k=1}^{n-1}\sum_{j=k+1}^{n} W_{k,j}^2 + \frac{1}{9}\sum_{k=1}^{n-1}\sum_{j=k+1}^{n}\sum_{i=k+1}^{n} W_{k,j} W_{k,i} \qquad\text{(Eqn. 8)}$$

In some examples, instead of assuming that the time series has no ties, trend detection engine 112 may use the following tie-adjusted formula for variance:

$$\text{Var}[S_w] = \sum_{k=1}^{n-1}\sum_{j=k+1}^{n} W_{k,j}^2 + \frac{1}{9}\sum_{k=1}^{n-1}\sum_{j=k+1}^{n}\sum_{i=k+1}^{n} W_{k,j} W_{k,i} - \qquad\text{(Eqn. 9)}$$

$$\left[\sum_{k_t\in[\text{ties\_list}]}\sum_{k=[k_t]}\sum_{j\in k_t} W_{k,j}^2 + \frac{1}{9}\sum_{k=[k_t]}\sum_{j\in k_t, j>k}\sum_{i\in k_t, i>k} W_{k,j} W_{k,i}\right]$$

In some examples, instead of determining and analyzing weighted sum $S_w$ of signs of differences between all possible combinations of data points as shown in Eqn. 5, trend detection engine 112 may determine and analyze a reduced weighted sum $\widetilde{S_w}$ —a weighted sum of signs of differences between successive data points:

$$\widetilde{S_w} = \sum_{k=1}^{n-1} W_{k,k+1}\text{sgn}(X_{k+1} - X_k) \qquad\text{(Eqn. 10)}$$

Reduced weighted sum $\widetilde{S_w}$ may indicate, among other things, which slopes (negative, positive, or neutral) are prevalent in the time series, and to which degree they are prevalent. Reduced weighted sum $\widetilde{S_w}$ may be considered a particular case of weighted sum $S_w$ where $W_{k,j}=0$ when $j\neq k+1$. Like weighted sum $S_w$, reduced weighted sum $\widetilde{S_w}$ may also be considered to be normally distributed with a zero mean. The variance of reduced weighted sum $\widetilde{S_w}$ may be calculated by trend detection engine 112, for example, using the following formula:

$$\text{Var}[\widetilde{S_w}] = \sum_{k=1}^{n-1} W_{k,k+1}^2 \qquad\text{(Eqn. 11)}$$

In some examples, to account for possible ties between subsequent data points, trend detection engine 112 may use the following tie-adjusted formula:

$$\text{Var}[\widetilde{S_w}] = \sum_{k=1}^{n-1} W_{k,k+1}^2 - \sum_{k_t\in[\text{ties\_list}]}\sum_{k=[k_t]} W_{k,k+1}^2 \qquad\text{(Eqn. 12)}$$

As discussed above, after determining the variance (e.g., $\text{Var}[S_w]$ or $\text{Var}[\widetilde{S_w}]$), trend detection engine 112 may test null hypothesis $H_0$ (and thereby determine whether or not the time series includes a trend) by calculating a standard normal variable based on the variance using Eqn. 3, and determine, using Eqn. 4, whether its absolute value exceeds a certain threshold. In some examples, instead of calculating a standard normal variable using Eqn. 3, trend detection engine 112 may use a modified standard normal variable $\hat{Z}$:

$$\hat{Z} = \begin{cases} \dfrac{S}{\sqrt{\text{Var}[S]}} & \text{if } S\neq 0 \\ 0 & \text{if } S = 0 \end{cases} \qquad\text{(Eqn. 13)}$$

where $S$ may be substituted with $S_w$ or $\widetilde{S_w}$, as discussed above.

Thus, in order to determine whether or not a particular time series includes a trend, trend detection engine 112 may determine either standard normal variable $Z$ or modified standard normal variable $\hat{Z}$ of either weighted sum $S_w$ or reduced weighted sum $\widetilde{S_w}$, and then compare either standard normal variable $Z$ or modified standard normal variable $\hat{Z}$ to a parameter $z_{\alpha/2}$ that may be calculated based on a predefined level of significance $\alpha$. Furthermore, as discussed above, variances $\text{Var}[S_w]$ and $\text{Var}[\widetilde{S_w}]$ may each be calculated with or without consideration of possible ties within the time series. If the variance is calculated without consideration of possible ties, and the time series in fact includes some ties, the value of weighted sum $S_w$ or reduced weighted sum $\widetilde{S_w}$ would have to be higher in order for the trend to fail the condition of Eqn. 4. Weighted sum $S_w$ (or reduced weighted sum $\widetilde{S_w}$) may be a good indicator of the trend's stability, and is therefore interchangeably referred to herein as the trend's "stability significance." Accordingly, a trend having some ties would have to have higher stability significance for it to be detected by trend detection engine 112, if trend detection engine 112 calculates its variance using a formula that assumes that the time series has no ties (e.g., Eqn. 8 or Eqn. 11).

Having determined that a given time series includes a trend, trend detection engine 112 may pass the time series, along with any calculated statistics for the time series (e.g., $S_w$ or $\bar{S_w}$ and variances thereof) to trend evaluation engine 113. In some examples, trend detection engine 112 may obtain a plurality of time series, determine for each time series whether or not it includes a trend as discussed above, and upon a determination that the time series includes a trend, pass the time series to trend evaluation engine 113.

In some examples, trend evaluation engine 113 may prioritize the detected trends based on the trend's stability significance as well as the contexts of the time series in which the trends were detected. For example, a time series may be associated with a certain "segment," such as a certain market (e.g., computer sales in the United States), a certain patient group (e.g., all patients with diabetes), etc., where the time series may describe various measurements within that segment. Furthermore, in some examples, a time series may be associated with a certain sub-segment within a certain segment, where each segment may be divided into a plurality of different sub-segments, each sub-segment being described by a different time series. For example, a segment "computer sales in the United States" may be divided into the following sub-segments: "laptop sales in the United States," "desktop sales in the United States," "computer sales by company A in the United States," "computer sales by company B in the United States," etc. A time series associated with a given segment or sub-segment may include data points (e.g., measurements) describing how a particular parameter associated with the segment or sub-segment (e.g., quarterly revenue) changed over time. For example, a time series associated with segment "computer sales in the United States" may include a plurality of data points, where each data point indicating the amount of revenue earned from all computer sales in the United States in a given quarter. Similarly, a time series associated with sub-segment "computer sales by company A in the United States" may include a plurality of data points, where each data point indicating the amount of revenue earned from all computer sales by company A in the United States in a given quarter.

In some examples, trend evaluation engine 113 may prioritize the trends based on their stability significance, and also based on various characteristics of the sub-segment to which a particular trend (i.e., the time series in which the trend was detected) belongs, as well as characteristics of the segment to which the sub-segment belongs, and other sub-segments of that segment.

In some examples, trend evaluation engine 113 may calculate, for each trend obtained from trend detection engine 112, a trend score $T_s$ and prioritize the trends based on their trend scores. Trend score $T_s$ may be a function of various factors. For example, trend score $T_s$ may be a function (e.g., a non-decreasing function) of the weighted sum $S_w$ or $\bar{S_w}$, which, as discussed above, may indicate the trend's stability significance.

In some examples, trend score $T_s$ may also be a function (e.g., a non-decreasing function) of a trend discrepancy $T_d$. Specifically, trends with higher trend discrepancy values may receive higher trend scores. In some examples, trend discrepancy $T_d$ may be calculated as a function (e.g., a non-decreasing function) of the discrepancy between the trend's stability significance and the stability significances of all trends associated with sub-segments of the same segment. This discrepancy may be calculated, for example, based on a ratio between the trend's stability significance and the standard deviation (or variance) of stability significances of all trends associated with sub-segments of the same segment.

In some examples, trend discrepancy $T_d$ may also be a function (e.g., a non-decreasing function) of the discrepancy between the slope of the trend's segment and the slopes of all segments. This discrepancy may be calculated, for example, based on a ratio between the slope of the trend's segment and the standard deviation (or variance) of slopes of all segments.

In some examples, trend discrepancy $T_d$ may also be a function (e.g., a non-decreasing function) of the discrepancy between the slope of the trend's sub-segment and the slope of the trend's segment. This discrepancy may be calculated, for example, based on a ratio between the slope of the trend's sub-segment and the slope of the trend's segment.

Thus, in some examples, trend discrepancy $T_d$ may be calculated by trend evaluation engine 113 using the following formula or another formula involving at least some of the same factors and any additional factors:

$$T_d = \left(\frac{\text{trend's stability significance}}{std\left(\begin{array}{c}\text{stability significances of all trends}\\ \text{associated with same segment}\end{array}\right)}\right)^\alpha. \quad \text{(Eqn. 14)}$$

$$\left(\frac{\text{slope of the trend's segment}}{std \text{ (slopes of all segments)}}\right)^\beta.$$

$$\left(\frac{\text{slope of the trend's sub\_segment}}{\text{slope of the trend's segment}}\right)^\gamma$$

where $\alpha$, $\beta$, and $\gamma$ are constants that may be predefined and/or dynamically modified based on user's inputs, which may include explicit commands to emphasize or de-emphasize some factors in the equation, or inputs implicitly indicating which factors are more important or less important to the user. For example, trend evaluation engine 113 may determine which factors to emphasize or de-emphasize based on the characteristics of trends previously selected and inspected by the user, i.e., trends in which the user showed interest in the past.

In some examples, the slope of a given trend may be calculated (e.g., by trend evaluation engine 113 or by trend detection engine 112) using an empirical approximation to linear regression, the values of the data points serving as Y values and the positions of the data points in the time series as X values, where the first (i.e., oldest) data point may correspond to X=0, for example. Thus, in some examples, the slope a of a trend may be calculated as follows:

$$a = \frac{\sum x_i y_i - n\mu(X)\mu(Y)}{(n-1)std(X)^2} \quad \text{(Eqn. 15)}$$

where n is the length of the trend (i.e., the length of the time series), $\mu$ is the mean, and std is the standard deviation.

In some examples, trend score $T_s$ may also be a function of a trend value $T_v$. Trend value $T_v$ may in some examples be a function (e.g., a non-decreasing function) of the size of the segment associated with the trend, which may be calculated as the sum of all data points associated with the segment. In some examples, trend value $T_v$ may also be a function of the slope of the trend's sub-segment. Thus, in some examples, trend value $T_v$ may be expressed using the following formula:

$$T_v = (\text{size of the trend's segment})^\delta (\text{slope of the trend's sub\_segment})^\lambda \quad \text{(Eqn. 16)}$$

where $\delta$ and $\lambda$ are constants that may be predefined and/or dynamically modified, for example, based on user's inputs.

Thus, in some examples, trend score $T_s$ may be a function of all the above-discussed factors:

$$T_s = f(S_w, T_d, T_v) \quad \text{(Eqn. 16)}$$

where, in some examples, $S_w$ may be substituted with $\overline{S_w}$. In some examples, trend score $T_s$ may be a function of fewer factors or more factors, where the additional factors may include, for example, user-defined or otherwise configurable factors, such as a minimum stability significance threshold, a filter filtering out various trends based on their segment or sub-segment characteristics, and so forth.

In some examples, different segments may differ a lot in terms of size, scale, and other parameters. Accordingly, for purposes of normalization, trend detection engine 112 and/or trend evaluation engine 113 may convert the original time series $\{X_t\}$ into a relative time series $\{\overline{X_t}\}$ of the above-described operations on the relative time series instead of the original time series. In some examples, each data point in the relative time series may be calculated by dividing its corresponding data point in the original time series by the size of the segment associated with the time series. In some examples, trend evaluation engine 113 may perform all its operations on relative time series a $\{\overline{X_t}\}$ detection engine 112 may perform all its operations (e.g., calculation of the weighted sum $S_w$ or $\overline{S_w}$) based on original time series $\{X_t\}$, or vice versa. Furthermore, while in some examples the trend detection and evaluation techniques discussed above are performed on the entire time series (i.e., all its samples), in other examples, a time window shorter than the entire time series may be defined (e.g., by the user), in which case trend detection engine 112 and trend evaluation engine 113 may detect and analyze trends within that time window, and disregard other portions of the time series, for example.

Figure 2:
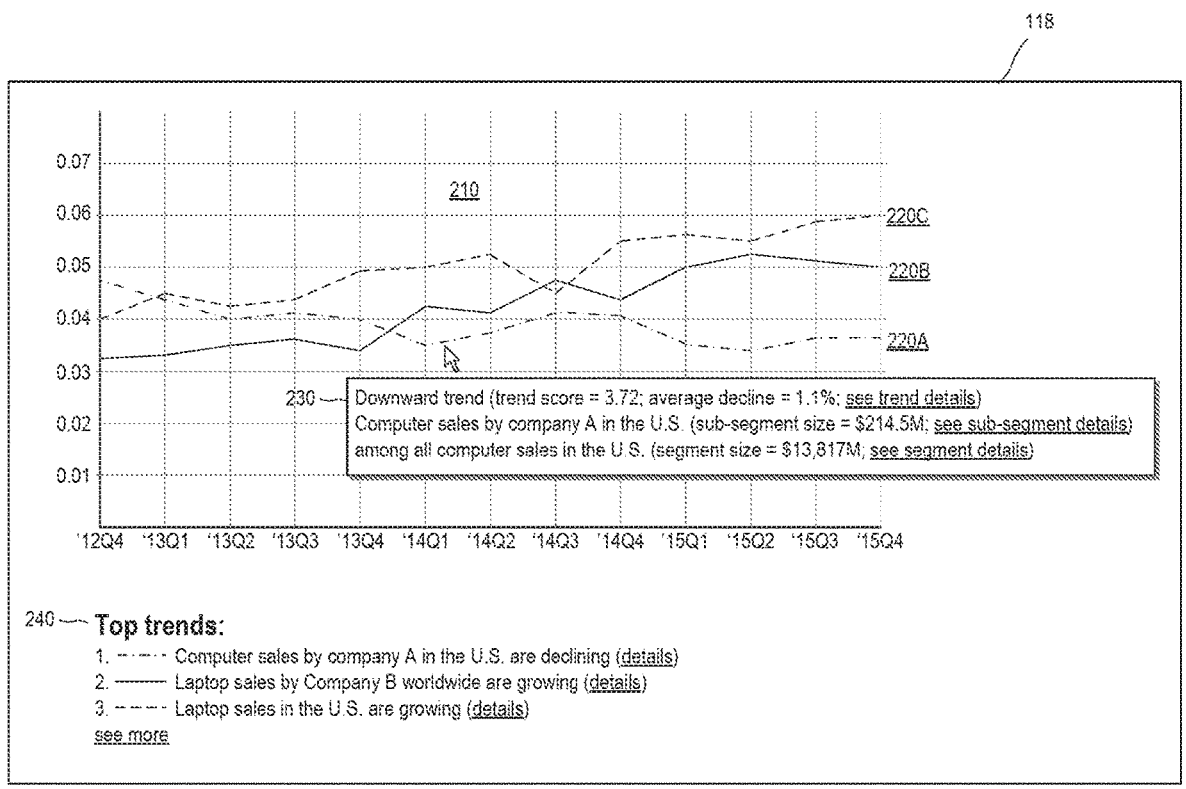
FIG. 2 shows an example display of an example computing device.

In some examples, after assigning trend scores to each trend detected by trend detection engine 112, trend evaluation engine 113 may pass the scores to GUI engine 114. GUI engine 114 may then provide one, some, or all of the trends to display 118 in accordance with their trend scores. For example, GUI engine 114 may provide for display N trends having the highest trend scores, where N may be a predefined number that may also be dynamically modified by the user. Providing a trend for display may include displaying the entire time series or at least a time window within the time series, in a form of a graph, for example. Thus, if two or more are provided for display, in some examples, these trends may be aligned and displayed over the same time axis. Furthermore, in some examples, the time series may be converted to relative time series (as discussed above) and GUI engine 114 may provide for display the relative time series instead of the original time series. FIG. 2 illustrates an example display 118 showing in a chart 210 three top-ranked trends 220A, 220B, and 220C.

In addition, GUI engine 114 may provide for display, e.g., in visual association with (e.g., on top of or next to) the displayed time series, additional information associated with the time series and/or the trend. For example, as illustrated in FIG. 2, in response to the user's selection of one of the trends (e.g., 200A), GUI engine 114 may provide for display a new window 230 containing the additional information. GUI engine 114 may also include a summary 240 of the top-ranked trends, providing the user an opportunity to select one of the trends from summary 240 and obtain additional information associated with the trend. In some examples (not shown in FIG. 2 for brevity), the user may zoom in or zoom out to change the time scale of chart 210.

As partially illustrated in the example of FIG. 2, the additional information may include, for example, information about the sub-segment and segment represented by the time series, such as their titles, sizes, statistical parameters, etc. The additional information may also include various parameters about the trend, such as its trend score, how its trend score is ranked relative to other trends, the values of the various factors based on which the trend score was computed (e.g., $S_w$, $T_d$, $T_v$, etc.), and any other relevant information.

In some examples, GUI engine 114 may also obtain user inputs. For example, a user may input information indicating which time series are to be analyzed by trend detection engine 112 and trend evaluation engine 113. In some examples, the user may provide an input identifying a database containing a plurality of data points. Computing device 100 may then use GUI engine 114 or another module to analyze the data points and automatically divide the data points into segments and sub-segments. In some examples, computing device 100 may divide the data points to all possible segments and sub-segments. In some examples, the user may identify a number of attributes (e.g., columns) of the data points, and computing device 100 may divide the data points to all possible segments and sub-segment, where each segment and sub-segment is defined by a particular combination of attribute values of the attributes identified by the user. After determining the plurality of segments and their sub-segments, computing device may also determine, for each sub-segment and segment, a corresponding time series describing that sub-segment or segment, as discussed above. In some examples, GUI engine 114 may also obtain a user input selecting a particular time window smaller than the entire available time range. Responsive to such user input, GUI engine 114 may cause engines 112 and 113 to re-detect and re-evaluate trends within the selected time window, disregarding data points outside the selected time window, after which GUI engine 114 may provide for display the re-detected and re-evaluated trends, replacing the previously displayed trends.

In the foregoing discussion, engines 112, 113, and 114 were described as any combinations of hardware and programming. Such components may be implemented in a number of fashions. The programming may be processor executable instructions stored on a tangible, non-transitory computer-readable medium and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. The computer-readable medium can be said to store program instructions that when executed by the processor resource implement the functionality of the respective component. The computer-readable medium may be integrated in the same device as the processor resource or it may be separate but accessible to that device and the processor resource. In one example, the program instructions can be part of an installation package that when installed can be executed by the processor resource to implement the corresponding component. In this case, the computer-readable medium may be a portable medium such as a CD, DVD, or flash drive or a memory maintained by a server from which the installation package can be downloaded and installed. In another example, the program instructions may be part of an application or applications already installed, and the computer-readable medium may include integrated memory such as a hard drive, solid state drive, or the like.

Figure 3:
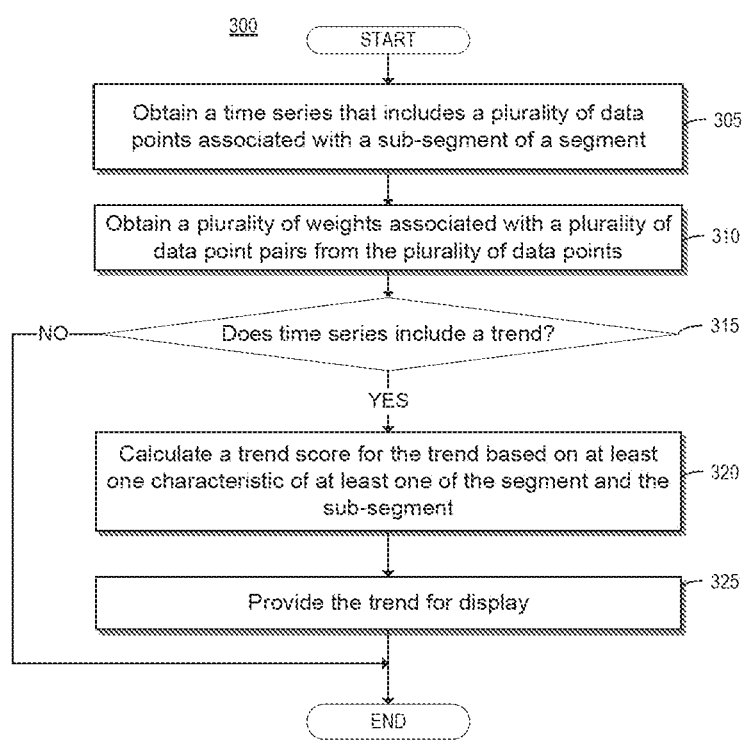
FIG. 3 shows a flowchart of an example method.

FIG. 3 is a flowchart of an example method 300. Method 300 may be described below as being executed or performed by a system or by a computing device such as computing device 100 of FIG. 1. Other suitable systems and/or computing devices may be used as well. Method 300 may be implemented in the form of executable instructions stored on at least one non-transitory machine-readable storage medium of the system and executed by at least one processor of the system. Alternatively or in addition, method 300 may be implemented in the form of electronic circuitry (e.g., hardware). In alternate examples of the present disclosure, one or more blocks of method 300 may be executed substantially concurrently or in a different order than shown in FIG. 3. In alternate examples of the present disclosure, method 300 may include more or less blocks than are shown in FIG. 3. In some examples, one or more of the blocks of method 300 may, at certain times, be ongoing and/or may repeat.

At block 305, method 300 may obtain a time series that includes a plurality of data points associated with a sub-segment of a segment. At block 310, method 300 may obtain a plurality of weights associated with a plurality of data point pairs from the plurality of data points. At block 315, method 300 may determine, based on the plurality of weights and the plurality of data point pairs, whether the time series includes a trend. If the time series includes a trend, method 300 may proceed to block 320. At block 320, method 300 may calculate a trend score for the trend based on at least one characteristic of at least one of the segment and the sub-segment. At block 325, method 300 may provide the trend for display.

Figure 4:
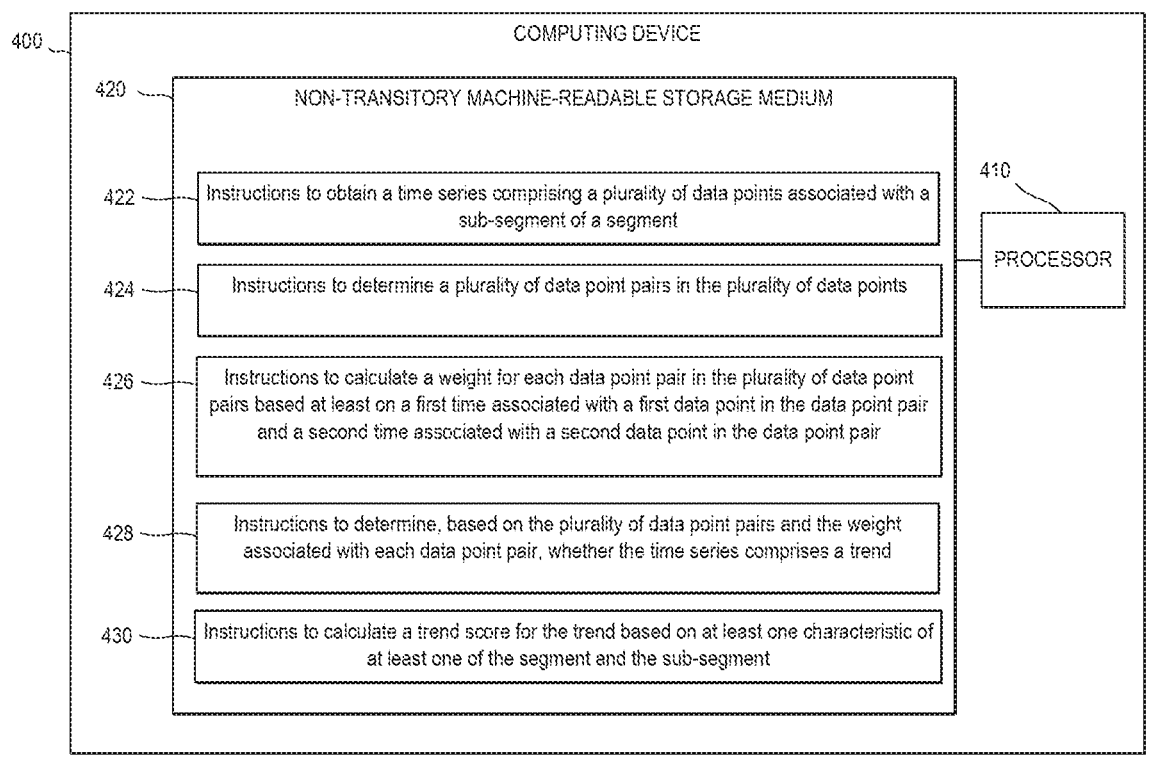
FIG. 4 is a block diagram of an example computing device.

Computing device 400 may be similar to computing device 100 of FIG. 1. In the example of FIG. 4, computing device 400 includes a processor 410 and a non-transitory machine-readable storage medium 420. Although the following descriptions refer to a single processor and a single machine-readable storage medium, it is appreciated that multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 410 may be one or more central processing units (CPUs), microprocessors, and/or other hardware devices suitable for retrieval and execution of instructions stored in non-transitory machine-readable storage medium 420. In the particular example shown in FIG. 4, processor 410 may fetch, decode, and execute instructions 422, 424, 426, 428, 430, or any other instructions (not shown for brevity). As an alternative or in addition to retrieving and executing instructions, processor 410 may include one or more electronic circuits comprising a number of electronic components for performing the functionality of one or more of the instructions in machine-readable storage medium 420. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Non-transitory machine-readable storage medium 420 may be any electronic, magnetic, optical, or other physical storage device that stores executable instructions. Thus, medium 420 may be, for example, Random Access Memory (RAM), an Electrically-Erasable Programmable Read-Only Memory (EEPROM), a storage drive, an optical disc, and the like. Medium 420 may be disposed within computing device 400, as shown in FIG. 4. In this situation, the executable instructions may be "installed" on computing device 400. Alternatively, medium 420 may be a portable, external or remote storage medium, for example, that allows computing device 400 to download the instructions from the portable/external/remote storage medium. In this situation, the executable instructions may be part of an "installation package". As described herein, medium 420 may be encoded with executable instructions.

Referring to FIG. 4, instructions 422, when executed by a processor (e.g., 410), may cause a computing device (e.g., 400) to obtain a plurality of data entries, each data entry comprising a plurality of attribute values of a plurality of attributes. Instructions 424, when executed by the processor, may cause the computing device to determine a plurality of data point pairs in the plurality of data points. Instructions 426, when executed by the processor, may cause the computing device to calculate a weight for each data point pair based at least on a first time associated with a first data point in the data point pair and a second time associated with a second data point in the data point pair. Instructions 428, when executed by the processor, may cause the computing device to determine whether the time series comprises a trend based on the plurality of data point pairs and the weight associated with each data point pair. Instructions 430, when executed by the processor, may cause the computing device to calculate a trend score for the trend based on at least one characteristic of at least one of the segment and the sub-segment.

The invention claimed is:

1. A computing device comprising:
   a processor; and
   a memory to store instructions that, when executed by the processor, cause the processor to:
      obtain a time series comprising a plurality of data points associated with a sub-segment of a segment;
      obtain a plurality of weights associated with a plurality of data point pairs from the plurality of data points;
      determine a stability significance of the time series based on the plurality of weights and the plurality of data point pairs, wherein determining the stability significance of the time series comprises determining a weighted sum of a plurality of signs corresponding to differences of the plurality of data point pairs;
      based on the stability significance of the time series, determine whether the time series comprises a trend;
      calculate a trend score for the trend based on the stability significance of the time series and at least one characteristic of at least one of the segment and the sub-segment; and
      provide data to display the time series on a graphical user interface (GUI).

2. The computing device of claim 1, wherein the instructions, when executed by the processor, further cause the processor to calculate the trend score based on at least one of:

a discrepancy between the stability significance of the time series and stability significances of a plurality of other time series associated with the segment;

a discrepancy between a stability significance of the segment and stability significances of a plurality of other segments;

a discrepancy between a slope associated with the segment and slopes associated with a plurality of segments;

a discrepancy between a slope associated with the sub-segment and the slope associated with the segment;

a size of the segment; or the slope associated with the sub-segment.

3. The computing device of claim 1, wherein the plurality of data point pairs comprises substantially all combinations of data points within the plurality of data points.

4. The computing device of claim 1, wherein each data point pair in the plurality of data point pairs comprises two subsequent data points.

5. The computing device of claim 1, wherein the instructions, when executed by the processor, further cause the processor to determine whether the time series comprises the trend based on a standard normal variable calculated based on the stability significance of the time series.

6. The computing device of claim 1, wherein the instructions, when executed by the processor, further cause the processor to calculate a weight for each data point pair in the plurality of data point pairs based on a first time associated with a first data point in the each data point pair and a second time associated with a second data point in the each data point pair.

7. The computing device of claim 1, wherein the trend is one of a plurality of trends, the trend score is one of a plurality of trend scores corresponding to the plurality of trends, and the instructions, when executed by the processor, further cause the processor to provide data for display of a summary of the plurality of trends sorted in accordance with the plurality of trend scores.

8. A method comprising:

obtaining, via a processor, a time series comprising a plurality of data points associated with a sub-segment of a segment;

obtaining, via the processor, a plurality of weights associated with a plurality of data point pairs from the plurality of data points;

based on the plurality of weights and the plurality of data point pairs, determining, via the processor, whether the time series comprises a trend, wherein the determination whether the time series comprises the trend comprises determining a stability significance of the time series based on a weighted sum of a plurality of signs corresponding to differences of the plurality of data point pairs; and based on a result of the determination of whether the time series comprises the trend:

calculating, via the processor, a trend score for the trend based on at least one characteristic of at least one of the segment and the sub-segment; and providing, via the processor, data for display of the trend.

9. The method of claim 8, further comprising calculating the trend score based on the stability significance of the time series and at least one of:

a discrepancy between the stability significance of the time series and stability significances of a plurality of other time series associated with the segment;

a discrepancy between a stability significance of the segment and stability significances of a plurality of other segments;

a discrepancy between a slope associated with the segment and slopes associated with a plurality of segments;

a discrepancy between a slope associated with the sub-segment and the slope associated with the segment;

a size of the segment; or the slope associated with the sub-segment.

10. The method of claim 8, wherein obtaining the plurality of weights comprises determining a weight for each data point pair in the plurality of data point pairs based on a first season associated with a first data point in the each data point pair and a second season associated with a second data point in the each data point pair.

11. The method of claim 8, wherein obtaining the plurality of weights comprises determining a weight for each data point pair in the plurality of data point pairs based on at least one of a first time associated with a first data point in the each data point pair and a second time associated with a second data point in the each data point pair.

12. A non-transitory machine-readable storage medium storing instructions that, when executed by a processor of a computing device, cause the computing device to:

obtain a time series comprising a plurality of data points associated with a sub-segment of a segment;

determine a plurality of data point pairs in the plurality of data points;

determine a plurality of weights based on the plurality of data point pairs;

based on the plurality of data point pairs and the plurality of weights, determine whether the time series comprises a trend, wherein the determination of whether the time series comprises the trend comprises determining a stability significance of the time series based on a weighted sum of a plurality of signs corresponding to differences of the plurality of data point pairs; and based on a result of the determination of whether the time series comprises the trend, calculate a trend score for the trend based on at least one characteristic of at least one of the segment or the sub-segment.

13. The non-transitory machine-readable storage medium of claim 12, wherein the instructions, when executed by the processor, further cause the computing device to calculate the trend score based on the stability significance of the time series and at least one of:

a discrepancy between the stability significance of the time series and stability significances of plurality of other time series associated with the segment;

a discrepancy between a stability significance of the segment and stability significances of a plurality of other segments;

a discrepancy between a slope associated with the segment and slopes associated with a plurality of segments;

a discrepancy between a slope associated with the sub-segment and the slope associated with the segment;

a size of the segment; or the slope associated with the sub-segment.

14. The non-transitory machine-readable storage medium of claim 12, wherein the instructions, when executed by the processor, further cause the computing device to convert the time series to a relative time series and calculate the trend score based on the relative time series.

15. The method of claim 8, wherein the determination whether the time series comprises the trend further comprises evaluating a standard normal variable calculated based on the stability significance of the time series.

16. The non-transitory machine-readable storage medium of claim 12, wherein the instructions, when executed by the processor, further cause the computing device to determine whether the times series comprises the trend based on a standard normal variable calculated based on the stability significance of the time series.

* * * * *